(12) United States Patent
Furuyama et al.

(10) Patent No.: US 8,523,421 B2
(45) Date of Patent: Sep. 3, 2013

(54) LIQUID CRYSTAL DISPLAY DEVICE

(75) Inventors: Masayoshi Furuyama, Togane (JP); Masahiko Kurihara, Togane (JP); Yasuhisa Shiraishi, Mobara (JP)

(73) Assignees: Hitachi Displays, Ltd., Chiba-ken (JP); Panasonic Liquid Crystal Display Co., Ltd., Hyogo-ken (JP)

(*) Notice: Subject to any disclaimer, the term of this patent is extended or adjusted under 35 U.S.C. 154(b) by 662 days.

(21) Appl. No.: 12/292,268

(22) Filed: Nov. 14, 2008

(65) Prior Publication Data

US 2009/0135627 A1 May 28, 2009

(30) Foreign Application Priority Data

Nov. 26, 2007 (JP) ................................. 2007-303886

(51) Int. Cl.
*F21V 21/04* (2006.01)
(52) U.S. Cl.
USPC ......................................... 362/623; 362/626
(58) Field of Classification Search
USPC ................................................. 362/623–626
See application file for complete search history.

(56) References Cited

U.S. PATENT DOCUMENTS

| 5,386,347 | A | * | 1/1995 | Matsumoto | 362/623 |
| 5,718,497 | A | * | 2/1998 | Yokoyama et al. | 362/625 |
| 6,068,382 | A | * | 5/2000 | Fukui et al. | 362/625 |
| 6,486,931 | B1 | * | 11/2002 | Ueda | 349/65 |
| 6,905,220 | B2 | * | 6/2005 | Wortman et al. | 362/627 |
| 7,004,612 | B2 | * | 2/2006 | Takahashi et al. | 362/615 |
| 7,833,593 | B2 | * | 11/2010 | Ouderkirk et al. | 428/34.1 |
| 2006/0062016 | A1 | * | 3/2006 | Dejima et al. | 362/600 |
| 2007/0274095 | A1 | * | 11/2007 | Destain | 362/609 |
| 2008/0002429 | A1 | * | 1/2008 | Noba | 362/612 |
| 2008/0043490 | A1 | * | 2/2008 | Coleman et al. | 362/623 |

FOREIGN PATENT DOCUMENTS

| JP | 09-197402 | 7/1997 |
| JP | 11-281976 | 10/1999 |
| JP | 11-329034 | 11/1999 |

* cited by examiner

*Primary Examiner* — David J Makiya
(74) *Attorney, Agent, or Firm* — Stites & Harbison, PLLC; Juan Carlos A. Marquez, Esq.

(57) ABSTRACT

To prevent, in a backlight where light emitting diodes are arranged on a side surface of a light guide plate, light leakage from a reflection sheet and reduce non-uniformity of emission light from the backlight. In a liquid crystal display device that includes a backlight that irradiates a liquid crystal panel with light, LEDs are disposed as light emitting elements on a light guide plate that is disposed in the backlight, a reflection sheet that comprises a multilayer film is disposed on a bottom surface of the light guide plate, projections are disposed by sandblasting on the bottom surface of the light guide plate in the vicinity of the LEDs, and tight adhesion between the reflection sheet and the light guide plate is prevented. In the vicinity of the LEDs, in order to counter light non-uniformity, reflecting grooves are not disposed and it is a mirror surface, but tight adhesion can be prevented by disposing the projections.

12 Claims, 8 Drawing Sheets

LIQUID CRYSTAL DISPLAY DEVICE

BACKGROUND OF THE INVENTION

1. Field of the Invention

The present invention relates to a light source of a non-self-luminous display device and in particular relates to a liquid crystal display device that includes a backlight that is disposed with a light guide plate and uses LEDs as light emitting elements.

2. Description of the Related Art

In recent years, liquid crystal display devices are being heavily used as display devices. In particular, liquid crystal display devices are used in display portions of portable devices because they are thin, lightweight, and save power.

However, liquid crystal display devices require illuminating means because they are not self-luminous. Among illuminating devices that are commonly used in liquid crystal display devices, a planar illuminating device called a backlight is prevalent. Conventionally, cold cathode fluorescent tubes are used for the light emitting elements (also called light sources) of a backlight, but in recent years, light emitting diodes (LEDs) are also being used as the light emitting elements.

A plate-shaped light guide plate is disposed in the backlight. The material of the light guide plate is a transparent resin or the like, and light that has been made incident on the light guide plate from the light emitting elements propagates through the light guide plate. Reflecting/scattering members such as grooves, projections or printed materials are disposed in the light guide plate. Because of these reflecting/scattering members, the light that propagates through the light guide plate is emitted toward a liquid crystal panel.

Some of the light whose traveling direction has changed because of the reflecting/scattering members is emitted to the outside of the light guide plate from the bottom surface of the light guide plate. A reflection sheet is formed on the bottom surface side of the light guide plate, and the light that has been emitted from the bottom surface is reflected toward the light guide plate by the reflection sheet toward the liquid crystal panel.

In JP-A-11-329034, there is description of a reflecting film where plural dielectric layers with different refractive indexes are laminated. However, in JP-A-11-329034, there is no description in regard to light escape of the reflecting film. Further, in JP-A-09-197402, there is description of a reflection sheet being surface-roughened by sandblasting. However, in JP-A-09-197402, there is no description of preventing light escape of the reflection sheet by sandblasting. Moreover, in JP-A-11-281976, there is description of surface-roughening a light guide plate by sandblasting. However, in JP-A-281976 also, there is no description of preventing light escape of the reflection sheet by sandblasting.

SUMMARY OF THE INVENTION

A liquid crystal display device includes a backlight that irradiates a liquid crystal panel with light, and a side light type of backlight includes light emitting elements, a light guide plate and a reflection sheet that is disposed on a bottom surface side of the light guide plate.

There are instances where a laminate film type of reflection sheet is used for the purpose of making luminance high. The laminate film type of reflection sheet is formed by laminating plural films with different refractive indexes on its surface.

Grooves for scattering light are formed in the bottom surface of the light guide plate, but there is a light guide plate where grooves are not disposed in the bottom surface in the vicinity of the light emitting elements in order to counter light non-uniformity. There has been discovered the problem that, at the portion where these groove are not disposed, the reflection sheet and the bottom surface of the light guide plate tightly adhere to each other.

The laminate film type of reflection sheet has a structure that reflects light as a result of plural layers whose refractive indexes are different being laminated. For that reason, when the surface of the reflection sheet does not contact an air layer, that is, when the reflection sheet directly contacts the light guide plate, light escape occurs. This phenomenon occurs because, when light is made incident on the laminate film type of reflection sheet from a material whose refractive index is different from that of the air layer, the light ends up being transmitted through, without being reflected by, the reflection sheet.

DETAILED DESCRIPTION OF THE EMBODIMENTS

Figure 1:
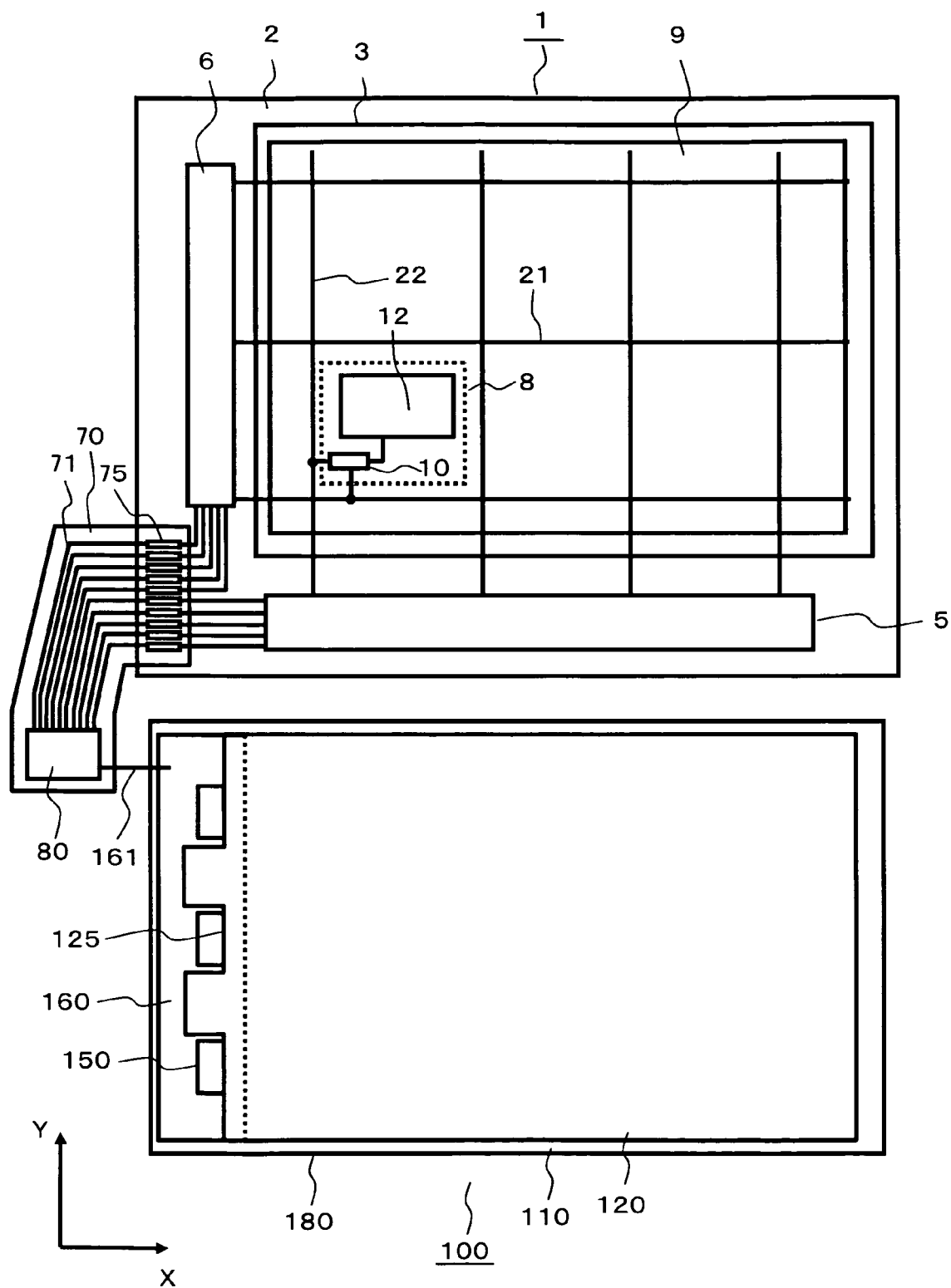
FIG. 1 is a block diagram showing the general configuration of a liquid crystal display device that is an embodiment of the present invention.

A liquid crystal display device includes a liquid crystal panel, a backlight that irradiates the liquid crystal panel with light, light emitting elements that are disposed in the backlight, and a light guide plate on which the light from the light emitting elements is made incident, wherein the light emitting elements are arranged on a side surface of the light guide plate.

Further, a reflection sheet that includes a multilayer film is formed on a bottom surface side of the light guide plate. Grooves are disposed as scattering members in the bottom surface of the light guide plate, and the grooves are disposed at constant intervals from the light emitting elements. Rough surfaces or projections are disposed by sandblasting on the bottom surface of the light guide plate between the grooves and the light emitting elements.

By giving the liquid crystal display device this configuration, the light guide plate can be prevented, by sandblasting, from tightly adhering to the reflection sheet. The rough surfaces or the projections are disposed on the light guide plate by sandblasting, whereby tight adhesion between the reflection sheet and the light guide plate at the portion where the grooves are not disposed is prevented. Further, the rough surfaces or the projections for preventing tight adhesion are formed between the light guide plate and the reflection sheet, whereby an air layer is disposed between the reflection sheet and the light guide plate. The air layer is disposed between the reflection sheet and the light guide plate, whereby escape of light that is transmitted through, without being reflected by, the reflection sheet is prevented such that the light is made incident on the multilayer film via the air layer.

Below, an embodiment of the present invention will be described with reference to the drawings. It will be noted that, in all of the drawings for describing the embodiment, the same reference numerals will be given to members that have the same functions and that redundant description thereof will be omitted.

FIG. 1 is a plan diagram showing a liquid crystal display device 100 according to the present invention. The liquid crystal display device 100 is configured by a liquid crystal panel 1, a backlight 110 and a control circuit 80. Signals and a power supply voltage that are necessary for display of the liquid crystal display device 100 are supplied from the control circuit 80. The control circuit 80 is installed on a flexible substrate 70, and the signals are transmitted to the liquid crystal panel 1 via wires 71 and terminals 75.

The backlight 110 is configured by a light guide plate 120, LEDs 150 and a storage case 180. The backlight 110 is disposed for the purpose of irradiating the liquid crystal panel 1 with light. The light crystal panel 1 controls the transmitted amount or the reflected amount of the light with which it has been irradiated from the backlight 110 to perform display. It will be noted that the backlight 110 is disposed superposed on the back surface side or the front surface side of the liquid crystal panel 1 with respect to a viewer, but in FIG. 1, the backlight 110 is shown next to the liquid crystal panel 1 in order to make it easier to understand.

The light guide plate 120 has a substantially rectangular shape, and the LEDs 150 are disposed on the side surface of the light guide plate 120. Reference numeral 160 is a flexible substrate that electrically interconnects the plural LEDs 150. The flexible substrate 160 and the control circuit 80 are electrically interconnected by a wire 161. The light that has been emitted from the LEDs 150 is made incident inside the light guide plate 120 from light entering surfaces (incident surfaces) of the light guide plate 120 and propagates through the inside of the light guide plate 120. The traveling direction of some of the light that travels inside the light guide plate is changed toward the liquid crystal panel 1 inside the light guide plate 120, and the liquid crystal panel 1 is irradiated with that light.

Next, the liquid crystal panel 1 will be described. The liquid crystal panel 1 includes two substrates comprising a TFT substrate 2 and a color filter substrate 3, and a liquid crystal composition is sandwiched between the two superposed substrates. Pixel electrodes 12 are disposed in pixel portions 8 of the TFT substrate 2. It will be noted that the liquid crystal panel 1 is disposed with numerous pixel portions 8 in a matrix, but in FIG. 1, just one of the pixel portions 8 is shown in order to avoid the drawing from becoming complicated. The pixel portions 8 that are arranged in a matrix form a display region 9, and each of the pixel portions 8 fulfills the role of a pixel of a display image and displays an image in the display region 9.

In FIG. 1, there are disposed gate signal lines (also called scan lines) 21 that extend in an x direction in the drawing and are arranged in a y direction and drain signal lines (also called picture signal lines) 22 that extend in the y direction and are arranged in the x direction, and the gate signal lines 21 and the drain signal lines 22 intersect. Further, the pixel portions 8 are formed in regions that are enclosed by the gate signal lines 21 and the drain signal lines 22.

A switching element 10 is disposed in each of the pixel portions 8. Control signals are supplied from the gate signal lines 21, and the switching ON and OFF of the switching elements 10 is controlled. When the switching elements 10 are switched to an ON state, picture signals that have been transmitted via the drain signal lines 22 are supplied to the pixel electrodes 12.

The drain signal lines 22 are connected to a drive circuit 5, and the picture signals are outputted from the drive circuit 5. The gate signal lines 21 are connected to a drive circuit 6, and the control signals are outputted from the drive circuit 6. It will be noted that the gate signal lines 21, the drain signal lines 22, the drive circuit 5 and the drive circuit 6 are formed on the same TFT substrate 2. Further, it is also possible to form the drive circuit 5, the drive circuit 6 and the control circuit 80 on one semiconductor chip.

Figure 2A:
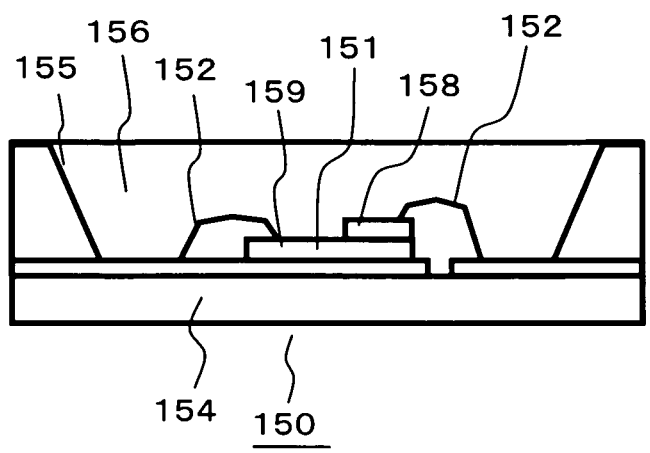
FIG. 2A and FIG. 2B are general diagrams showing light emitting diodes of the liquid crystal display device that is the embodiment of the present invention.
Figure 2B:
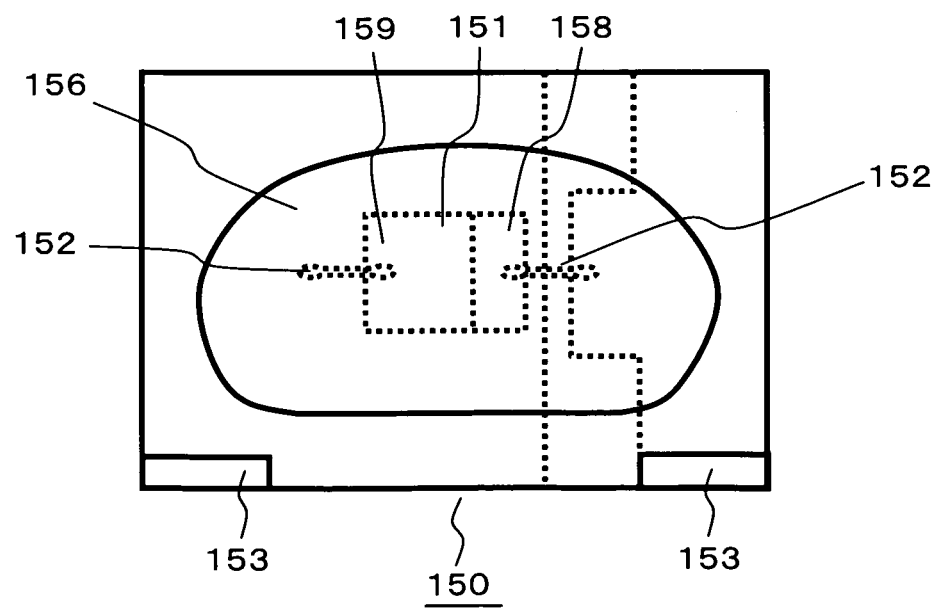

Next, FIG. 2 shows a general diagram of the LEDs 150 that are light emitting elements. FIG. 2A shows a general cross-sectional diagram, and FIG. 2B shows a light emission side front diagram.

Each of the LEDs 150 has a structure where an LED chip 151 that is a light emitting portion is installed on a chip substrate 154. The LED chip 151 includes a pn junction and emits light in a specific wavelength when a voltage is applied to the pn junction. On a p-type semiconductor layer that forms the pn junction, there is disposed a p electrode (anode) 158, and on an n-type semiconductor layer, there is disposed an n electrode (cathode) 159.

Wires 152 are connected to the p electrode 158 and the n electrode 159. The wires 152 electrically connect the p electrode 158 and the n electrode 159 to chip terminals 153 that are disposed in order to connect the LED 150 to the outside.

There are also instances where a fluorescent light emitting portion 156 is disposed on the emission surface side of the LED chip 151. The fluorescent light emitting portion has the function of converting the wavelength of the light that is emitted from the LED chip 151. Reference numeral 155 is a reflecting portion that forwardly reflects the light.

Figure 3A:
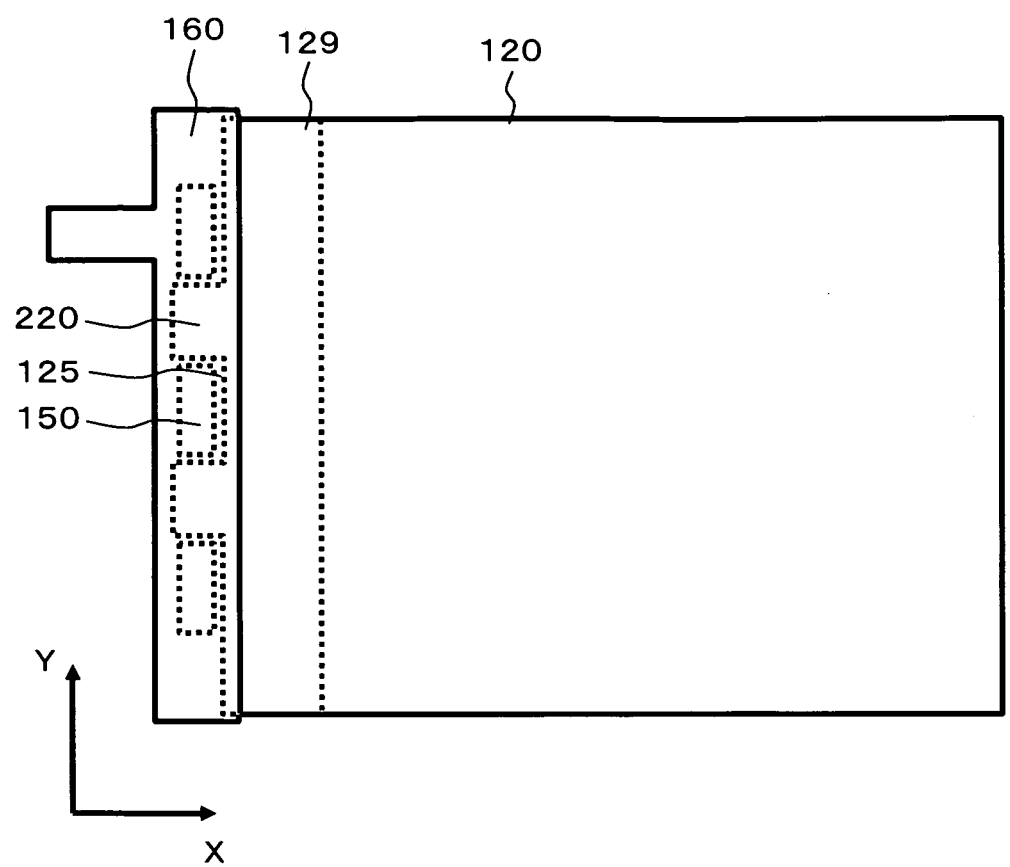
FIG. 3A and FIG. 3B are general diagrams showing a light guide plate of the liquid crystal display device that is the embodiment of the present invention.
Figure 3B:
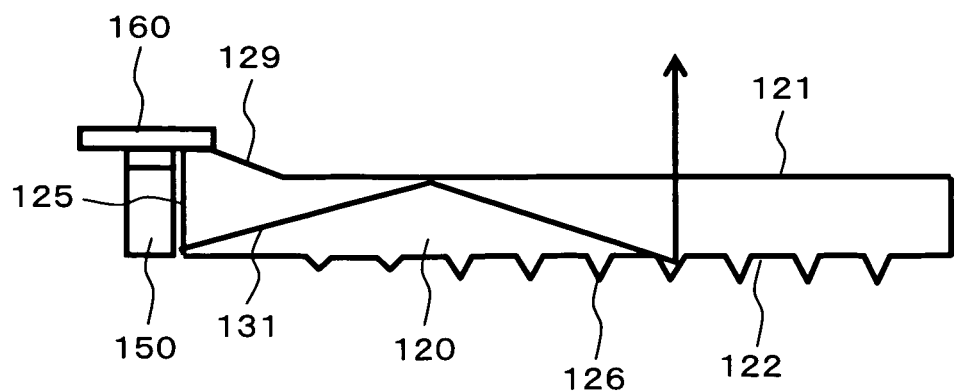

Next, FIG. 3A shows a general plan diagram of the light guide plate 120, and FIG. 3B shows a general side diagram. The light guide plate 120 is substantially rectangular as shown in FIG. 3A and includes a top surface (also called a light exiting surface) 121 and an undersurface (also called a bottom surface) as shown in FIG. 3B. The light guide plate 120 comprises a material that transmits light, such as acrylic resin or polycarbonate, is plate-shaped, and is formed such that its thickness is 1.0 mm to 0.2 mm.

In FIG. 3B, the cross section of the light guide plate 120 is substantially rectangular, but a slanted surface 129 is formed from the incident surfaces 125 toward the light exiting surface 121. This slanted surface 129 is effective when the thickness of the LED 150 is thick with respect to the thickness of the light exiting surface 121, and the slanted surface 129 guides, toward the light exiting surface 121, light that has been made incident from the incident surfaces 125 that are thicker than the light exiting surface 121.

In FIG. 3A and FIG. 3B, there is shown the positional relationship between the light guide plate 120, the LEDs 150 and the flexible substrate 160. On at least one side of the light guide plate 120, there are disposed the incident surfaces 125, and in the vicinity of the incident surfaces 125, there are disposed the plural LEDs 150. The LEDs 150 are arranged along the incident surfaces 125 on the underside of the flexible substrate 160.

On the light guide plate 120 side of the flexible substrate 160, there is disposed an adhesive sheet 190, and the flexible substrate 160 is adhered and fixed to the light guide plate 120, whereby the positions of the LEDs 150 are aligned with respect to the incident surfaces 125.

Next, light 131 that exits from the LEDs 150 will be described using FIG. 3B. The light 131 that has exited from the LEDs 150 is made incident on the light guide plate 120 from the incident surfaces 125. The refractive index of the light guide plate 120 is larger than that of air, so the light that has reached the incident surfaces 125 at an angle larger than a specific angle with respect to a perpendicular direction of the incident surfaces 125 is reflected, and the light that has reached the incident surfaces 125 at an angle smaller than the specific angle enters the inside of the light guide plate 120.

The top surface 121 and the undersurface 122 of the light guide plate 120 are substantially orthogonal to the incident surfaces 125, and the light that has been made incident inside the light guide plate 120 is repeatedly totally reflected by the top surface 121 and the undersurface 122 of the light guide plate 120 and travels inside the light guide plate 120. In the undersurface 122, there are disposed V-shaped grooves 126 as reflecting portions. Some of the light that travels through the light guide plate 120 is reflected toward the top surface by the grooves 126 that are disposed in the undersurface and is emitted from the top surface 121. It will be noted that, although the V-shaped grooves 126 are described as one example of the reflecting portions, it suffices as long as the reflecting portions direct the light that travels through the light guide plate toward the top surface 121, and it is also possible to use white color dots that are disposed by printing or the like.

Figure 4A:
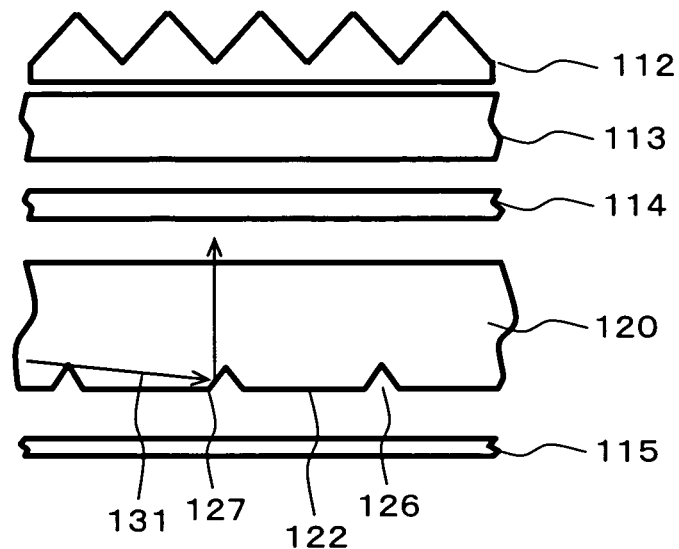
FIG. 4A and FIG. 4B are general cross-sectional diagrams showing the light guide plate of the liquid crystal display device that is the embodiment of the present invention.
Figure 4B:
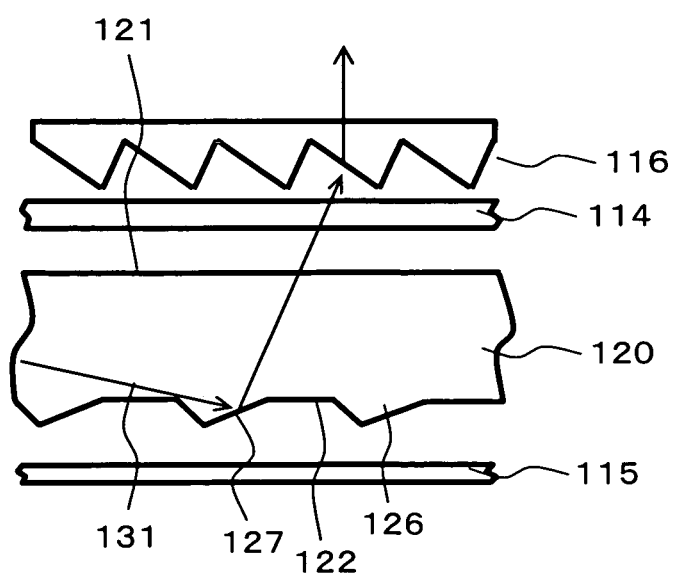

Next, the light that is reflected by the grooves 126 will be described using FIG. 4A and FIG. 4B. FIG. 4A shows a case where the grooves 126 are inwardly convex, and FIG. 4B shows a case where the grooves 126 are outwardly convex. The grooves 126 include reflecting surfaces (also called slanted surfaces) 127, and the reflecting surfaces 127 have an angle of 1 degree to 35 degrees with respect to the undersurface 122. The light that has been reflected by the reflecting surfaces 127 is reflected toward the top surface 121 of the light guide plate 120. It is possible to make the angle of the light with respect to the top surface 121 an angle at which the light is capable of exiting from the top surface 121 by causing the light to be reflected by the reflecting surfaces 127. That is, as mentioned previously, inside the light guide plate 120, the light is repeatedly totally reflected, but because of the reflecting surfaces 127, the light becomes an angle at which the light is capable of being emitted and is emitted from the light guide plate 120.

As shown in FIG. 4A, on the top surface 121 of the light guide plate 120, there are disposed prism sheets 112 and 113 that control the orientation of the light that has been emitted from the light guide plate 120. It will be noted that, in FIG. 4A, the prism sheets 112 and 113 are arranged such that triangular prism ridge lines intersect. For that reason, the prism sheet 113 is capable of refracting, in a transverse direction, the traveling direction of the light that has been emitted from the light guide plate 120 and directing the light inside (toward the liquid crystal panel). Further, reference numeral 114 is a diffusion plate, and reference numeral 115 is a reflection sheet.

Next, FIG. 4B shows a case where one asymmetric prism sheet is used. The light that has been reflected by the reflecting surfaces 127 becomes an obtuse angle with respect to the vertical direction of the top surface 121 and is emitted such that it spreads outward (rightward in the drawing) from the top surface 121. On the light guide plate 120, there is disposed an asymmetric prism sheet 116 that refracts the light proceeding outward towards the liquid crystal panel (not shown).

On the underside of the light guide plate 120, there is disposed the reflection sheet 115. The reflection sheet 115 has the role of returning, to the liquid crystal panel, the light that has passed through the reflecting surfaces 127 and been emitted toward the bottom surface of the light guide plate 120.

This reflection sheet 115 is a sheet where plural thin films that have different refractive indexes are laminated on a synthetic resinous base material and reflects light of a specific wavelength by controlling the thickness of the thin films.

Figure 5:
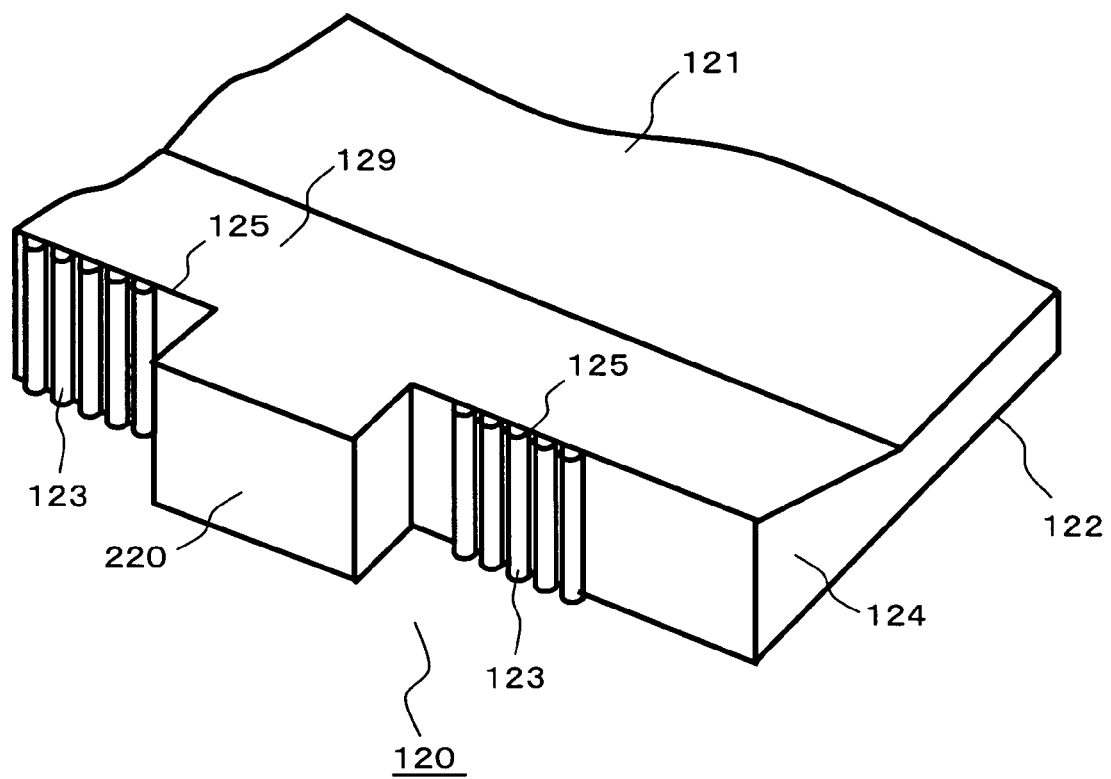
FIG. 5 is a general perspective diagram showing a light entering portion of the light guide plate of the liquid crystal display device that is the embodiment of the present invention.

Next, the structure of a light entering portion 124 of the light guide plate 120 in the vicinity of the LEDs 150 will be described using FIG. 5. FIG. 5 is a general perspective diagram of the light entering portion 124 of the light guide plate 120.

The side surface of the light guide plate 120 is configured as the incident surfaces 125, and the light of the LEDs 150 is made incident inside the light guide plate 120 from the incident surfaces 125. Lenses 123 are formed on the incident surfaces 125, and the lenses 123 fulfill the role of scattering the light that is made incident from the LEDs 150 inside the light guide plate 120.

Whereas cold-cathode fluorescent tubes that have conventionally been used as light sources are linear light sources, the LEDs 150 are close to point light sources and have the problem that they are arranged apart from each other. Consequently, so-called light non-uniformity, where the light is strong particularly in the vicinities of the incident surfaces 125 that face the LEDs 150 and where the light is weak between the LEDs 150, becomes remarkable in the vicinities of the LEDs 150.

In order to counter this light non-uniformity, the lenses 123 or the like are used to scatter, in the direction of the adjacent LEDs 150, the light that has been made incident. Further, in the light entering portion 124, the height of the grooves 126 and the distance from the incident surfaces 125 to the grooves 126 is micro-adjusted to control light non-uniformity.

Moreover, the slanted surface 129 is disposed in the light entering portion 124. As mentioned previously, this slanted surface 129 is effective when the thickness of the light guide plate 120 at the light exiting surface 121 is thinner than the thickness of the LEDs 150. The slanted surface 129 is used to guide the light from the incident surfaces 125 to the light exiting surface 121. It will be noted that a portion where the grooves 126 are not formed arises on the bottom surface 122 corresponding to the slanted surface 129 such that the light is not emitted from the slanted surface 129.

There are also instances where a projecting portion 220 is disposed between two of the incident surfaces 125 that are adjacent. The projecting portions 220 are disposed because it is difficult to adhere the FPC 160 to the slanted surface 129. That is, the FPC 160 on which the LEDs 150 have been mounted is adhered to the top surfaces of the projecting portions 220.

In this manner, in the light entering portion 124, a portion where the grooves 126 are not disposed is disposed on the bottom surface that faces the slanted surface 129 and the bottom surfaces of the projecting portions 220. For that reason, a problem arises where the bottom surface 122 of the light entering portion 124 becomes a mirror surface and the reflection sheet tightly adheres.

Figure 6A:
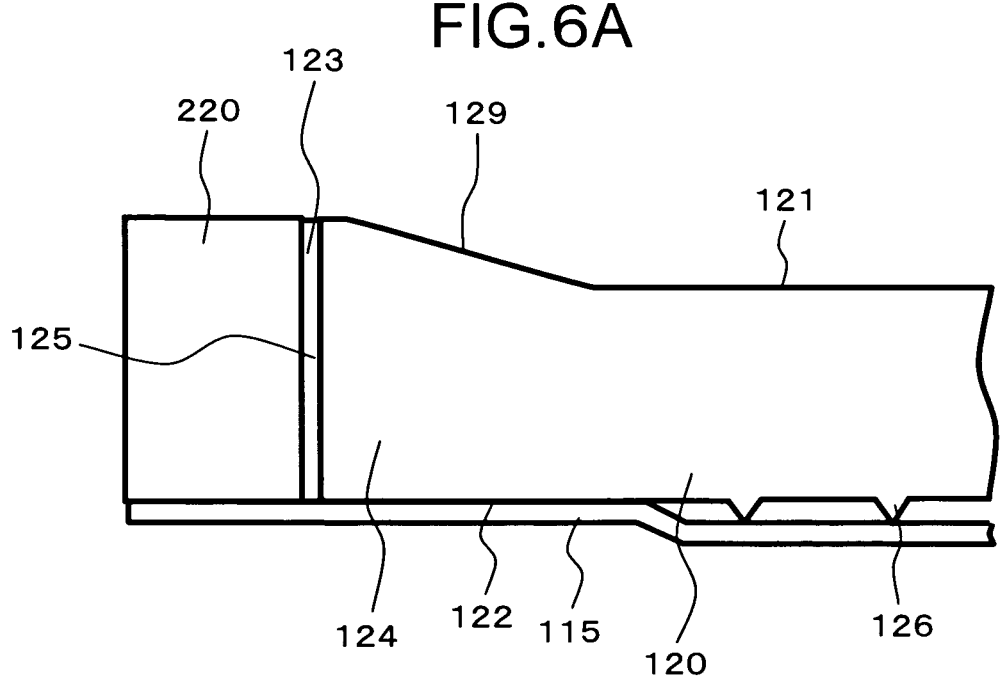
FIG. 6A and FIG. 6B are general cross-sectional diagrams showing the vicinity of the light entering portion of the liquid crystal display device that is the embodiment of the present invention.
Figure 6B:
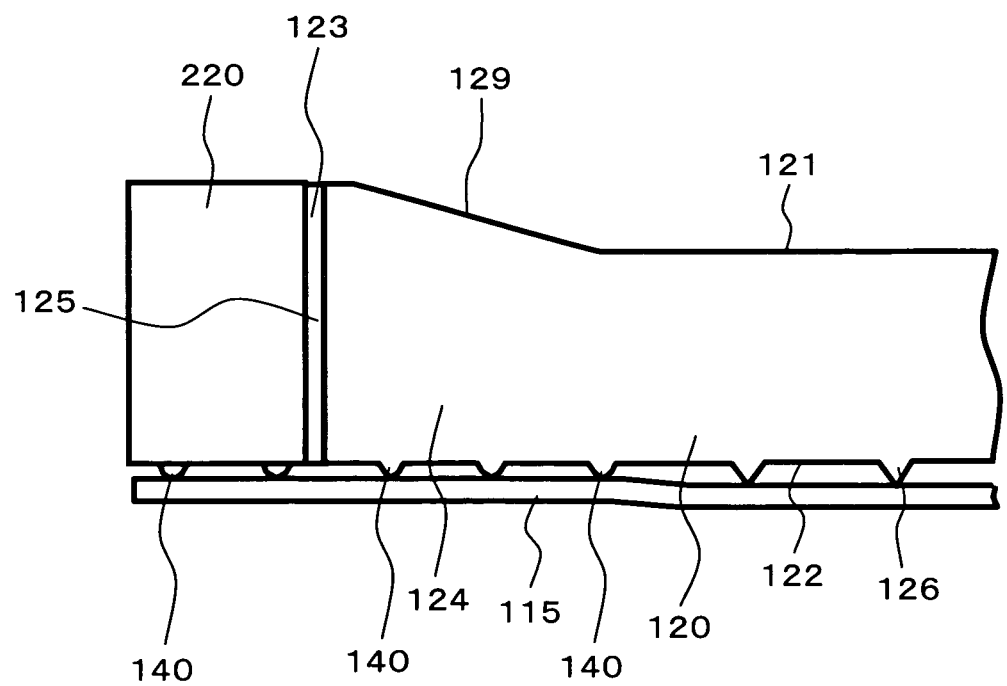

FIG. 6A shows a state where the bottom surface 122 is a mirror surface and where the reflection sheet 115 tightly adheres to the light guide plate 120, and FIG. 6B shows a state where projections 140 are disposed such that the reflection sheet 115 does not tightly adhere to the light guide plate 120. The interval between the reflection sheet 115 and the light guide plate 120 is maintained by the grooves 126, but at the portion where the grooves 126 are not disposed, the reflection sheet 115 easily tightly adheres to the light guide plate 120.

For that reason, in FIG. 6B, the projections 140 are formed by sandblasting or the like to prevent the reflection sheet 115 from tightly adhering to the light guide plate 120. The height of the grooves 126 is 4 to 5 µm, but even when the projections 140 are of the same height as or less than the grooves 126, tight adhesion between the light guide plate 120 and the reflection sheet 115 can be prevented. It will be noted that the projections 140 are capable of being formed by a method where recesses are formed and where the recesses are filled with a resin to form the projections by sandblasting or the like in a mold that injection-molds the light guide plate 120.

Further, as shown in FIG. 6A, when the reflection sheet 115 tightly adheres to the light guide plate 120, a problem also arises where the light is not reflected by the bottom surface 122 of the light guide plate 120 but is transmitted toward the reflection sheet 115. That is, when the reflection sheet 115 and the light guide plate 120 tightly adhere to each other, the light guide plate 120 contacts a layer whose refractive index is lower than that of the air layer, and the light is emitted without being totally reflected by the bottom surface 122. For that reason, not only does the light that has been emitted from the light guide plate 120 leak, but a problem also arises where the light is transmitted through and emitted from the reflection sheet 115 at a place which becomes a problem when the light is emitted.

Figure 7:
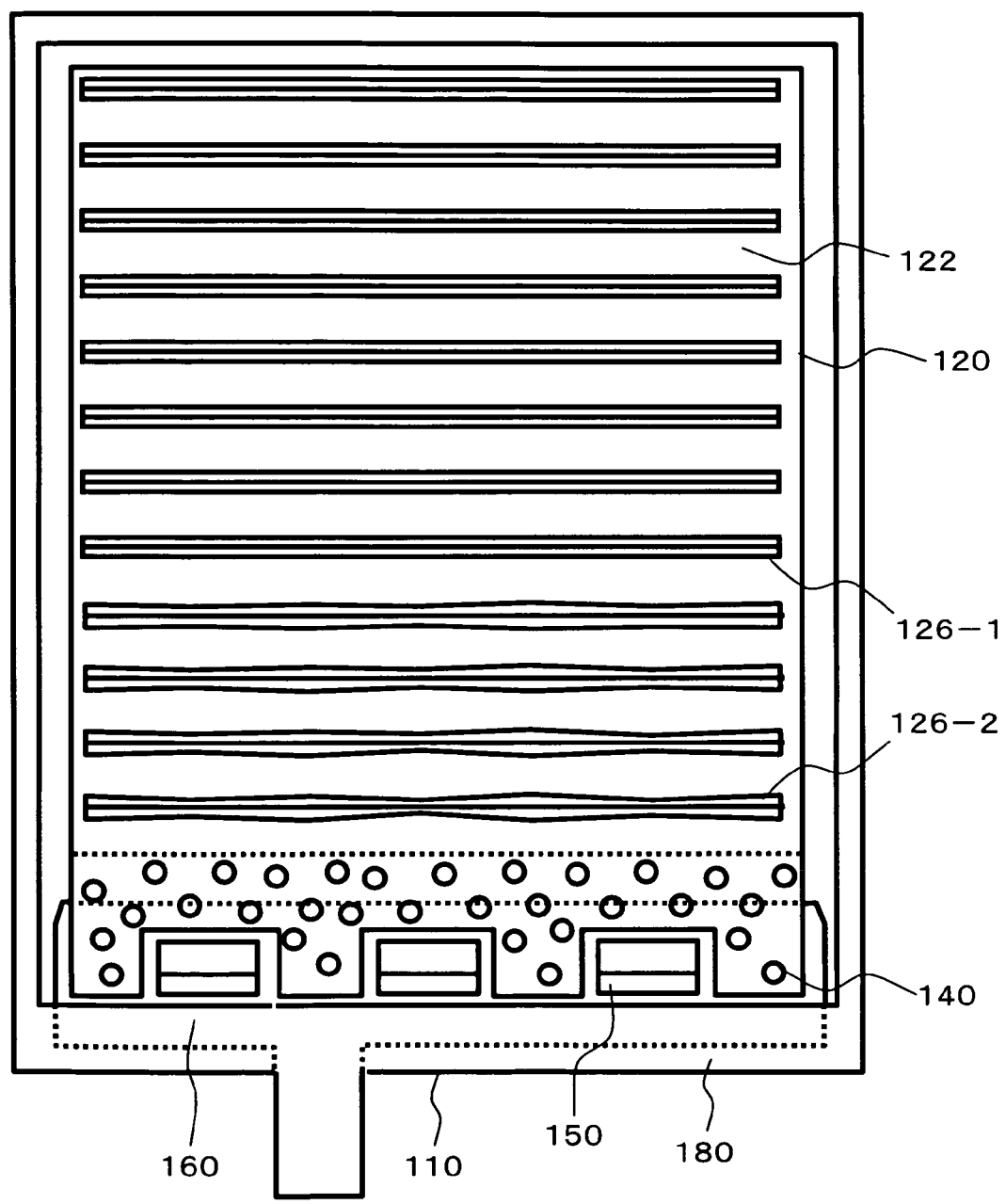
FIG. 7 is a general plan diagram showing the light guide plate of the liquid crystal display device that is the embodiment of the present invention.

Next, the positional relationship between the grooves 126 and the projections 140 will be described using FIG. 7. The projections 140 are arranged so as to be dispersed between the LEDs 150 and the grooves 126, and it is possible to prevent the reflection sheet 115 from tightly adhering to the light guide plate 120 by adjusting the height and density of the projections 140.

Further, the height of grooves 126-2 is changed in comparison to the height of grooves 126-1. In the grooves 126-2, at positions far from the LEDs 150, the height of the grooves is made higher such that the amount of the light that is reflected by the grooves 126-2 is increased. FIG. 7 shows a state where the width of the grooves 126-2 becomes wider in accordance with the height of the grooves 126-2.

Figure 8:
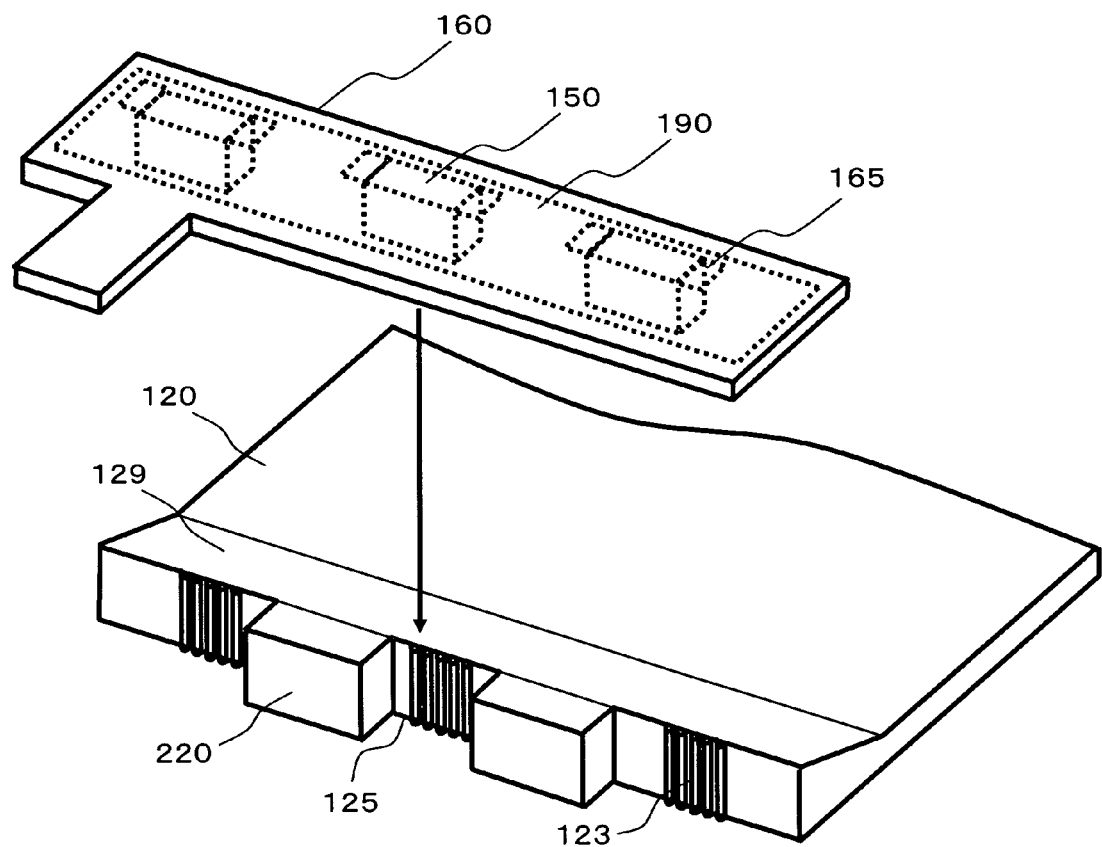
FIG. 8 is a general perspective diagram showing the light entering portion of the light guide plate of the liquid crystal display device that is the embodiment of the present invention.

Next, FIG. 8 shows a state where the FPC 160 is adhered to the projecting portions 220. The adhesive sheet 190 is disposed on the back side of the FPC 160 and fixes the FPC 160 to the projecting portions 220. When the distance between the light entering surfaces (incident surfaces) 125 of the light guide plate 120 and the LEDs 150 changes, the amount of light that is made incident on the light guide plate 120 remarkably changes, so the FPC 160 is fixed to the light guide plate 120 by the adhesive sheet 190. By fixing the FPC 160 to the projecting portions 220, it is possible to ensure that the distance between the light entering surfaces (incident surfaces) 125 and the LEDs 150 does not easily change. It will be noted that reference numeral 165 is solder pads that fix and electrically connect the LEDs 150 to the FPC 160.

What is claimed is:

1. A liquid crystal display device comprising:
a liquid crystal panel;
a backlight irradiating the liquid crystal panel with light;
light emitting elements being disposed in the backlight and arranged along one direction;
a light guide plate;
a light exiting surface being disposed on the light guide plate;
a bottom surface facing the light exiting surface; and
a reflection sheet being disposed on the bottom surface side of the light guide plate,
wherein a multilayer film is formed on the surface of the reflection sheet,
the multilayer film includes a plurality of laminated films having different refractive indexes,
grooves for scattering light are formed in the bottom surface of the light guide plate,
the bottom surface between the grooves and the light emitting elements is formed with a rough surface so as to define an air gap between the bottom surface and the reflection sheet,
the rough surface includes a projection,
a width of the projection is smaller than a width of each of the grooves,
each of the grooves extends along the same direction as the arranged light emitting elements, and
a plurality of projections are arranged so as to be dispersed between the light emitting elements and the grooves.

2. A liquid crystal display device according to claim 1, wherein a side surface of the light guide plate that faces the light emitting elements is configured as light incident surfaces, lenses are disposed on the light incident surfaces, and sandblasting is administered to the bottom surface in a vicinity of the lenses.

3. A liquid crystal display device according to claim 1, wherein a side surface of the light guide plate that faces the light emitting elements is configured as light incident surfaces, the liquid crystal display device includes a slanted surface from the light incident surfaces toward the light exiting surface, and sandblasting is administered to the bottom surface that faces the slanted surface.

4. A liquid crystal display device according to claim 1, wherein a side surface of the light guide plate that faces the light emitting elements is configured as light incident surfaces, projecting portions that project from the light incident surfaces toward the opposite direction of the light exiting surface are disposed, and sandblasting is administered to bottom surfaces of the projecting portions.

5. A liquid crystal display device comprising:
a liquid crystal panel;
a backlight irradiating the liquid crystal panel with light;
a light guide plate being disposed in the backlight; and
plural light emitting diodes being arranged along a side surface of the light guide plate,
wherein the light guide plate includes a light exiting surface from which the light is emitted and a bottom surface that faces the light exiting surface,
grooves that are disposed such that the light is emitted from the light guide plate are disposed in the bottom surface of the light guide plate,
a reflection sheet is disposed along the bottom surface of the light guide plate, the reflection sheet includes a multilayer film,
the multilayer film includes a plurality of laminated films having different refractive indexes, projections that prevent tight adhesion between the light guide plate and the reflection sheet are disposed in the vicinity of the light emitting diodes of the light guide plate, a width of the projection is smaller than a width of each of the grooves, each of the grooves extends along a same direction as the arranged light emitting diodes, and a plurality of projections are arranged so as to be dispersed between the light emitting diodes and the grooves.

6. A liquid crystal display device according to claim 5, wherein the side surface of the light guide plate that faces the light emitting diodes is configured as light incident surfaces, lenses are disposed on the light incident surfaces, and the projections are disposed on the bottom surface in a vicinity of the lenses.

7. A liquid crystal display device according to claim 5, wherein the side surface of the light guide plate that faces the light emitting diodes is configured as light incident surfaces, the liquid crystal display device includes a slanted surface from the light incident surfaces toward the light exiting surface, and the projections are disposed on the bottom surface that faces the slanted surface.

8. A liquid crystal display device according to claim 5, wherein
the side surface of the light guide plate that faces the light emitting diodes is configured as light incident surfaces, projecting portions that project from the light incident surfaces toward the opposite direction of the light exiting surface are disposed, and the projections are disposed on bottom surfaces of the projecting portions.

9. A liquid crystal display device according to claim 5, wherein the side surface of the light guide plate that faces the light emitting diodes is configured as light incident surfaces, projecting portions that project from the light incident surfaces toward the opposite direction of the light exiting surface are disposed, the projections are disposed on bottom surfaces of the projecting portions, and a substrate on which the light emitting diodes are mounted is adhered to top surfaces of the projecting portions.

10. A liquid crystal display device comprising:
a liquid crystal panel; and
a planar illuminating device irradiating the liquid crystal panel with light, wherein
a light guide plate that includes a light exiting surface and a bottom surface that faces the light exiting surface is disposed in the planar illuminating device,
a side surface that intersects the light exiting surface or the bottom surface is disposed in the light guide plate,
plural LEDs are disposed along a first side surface of the light guide plate,
light of the LEDs is made incident from the first side surface,
the first side surface is configured as light incident surfaces of the light guide plate,
the light that has been made incident on the light guide plate is directed toward the light exiting surface by a scattering member disposed on the bottom surface of the light guide plate and is emitted from the light exiting surface,
a reflection sheet that includes a multilayer film is disposed on the bottom surface side of the light guide plate,
the multilayer film includes a plurality of laminated films having different refractive indexes,
spacing members are disposed between the reflection sheet and the light guide plate so as to define an air gap between the bottom surface and the reflection sheet,
a width of each spacing member is smaller than a width of each of the scattering member,
the scattering member extends along a same direction as the LEDs are disposed, and
a plurality of spacing members are arranged so as to be dispersed between the LEDs and the scattering member.

11. A liquid crystal display device according to claim 10, wherein lenses are disposed on the first side surface, and the spacing members are disposed on the bottom surface in vicinity of the lenses.

12. A liquid crystal display device according to claim 10, wherein the liquid crystal display device includes a slanted surface from the first side surface toward the light exiting surface, and the spacing members are disposed on the bottom surface that faces the slanted surface.

* * * * *